(12) United States Patent
Huang

(10) Patent No.: US 12,460,812 B2
(45) Date of Patent: Nov. 4, 2025

(54) LIGHTING DEVICE AND CEILING FAN LAMP

(71) Applicant: Star Mount Enterprise Limited, Hong Kong (CN)

(72) Inventor: Xiang Hua Huang, Hong Kong (CN)

(73) Assignee: Star Mount Enterprise Limited, Hong Kong (CN)

( * ) Notice: Subject to any disclaimer, the term of this patent is extended or adjusted under 35 U.S.C. 154(b) by 0 days.

(21) Appl. No.: 17/948,245

(22) Filed: Sep. 20, 2022

(65) Prior Publication Data

US 2023/0332767 A1   Oct. 19, 2023

Related U.S. Application Data

(63) Continuation of application No. PCT/CN2022/103310, filed on Jul. 1, 2022.

(30) Foreign Application Priority Data

Apr. 14, 2022  (CN) .......................... 202220864717.0

(51) Int. Cl.
| | |
|---|---|
| *F21V 3/00* | (2015.01) |
| *F04D 25/08* | (2006.01) |
| *F21V 23/00* | (2015.01) |
| *F21V 33/00* | (2006.01) |

(52) U.S. Cl.
CPC ........ *F21V 33/0096* (2013.01); *F04D 25/088* (2013.01); *F21V 23/005* (2013.01)

(58) Field of Classification Search
CPC .............................. F21V 33/0096; F21V 23/00
See application file for complete search history.

(56) References Cited

U.S. PATENT DOCUMENTS

| | | | | |
|---|---|---|---|---|
| 7,614,769 B2 * | 11/2009 | Sell | ..................... | F21V 19/0055 362/147 |
| 2015/0009666 A1 * | 1/2015 | Keng | ................... | F21V 33/0096 362/249.02 |

FOREIGN PATENT DOCUMENTS

| | | |
|---|---|---|
| CN | 206176194 | 5/2017 |
| CN | 206269086 | 6/2017 |
| CN | 207305002 | 5/2018 |
| CN | 211345237 | 8/2020 |
| CN | 211399356 | 9/2020 |
| CN | 215001263 | 12/2021 |

OTHER PUBLICATIONS

"International Search Report (Form PCT/ISA/210) of PCT/CN2022/103310," mailed on Dec. 21, 2022, pp. 1-5.
"Written Opinion of the International Searching Authority (Form PCT/ISA/237) of PCT/ CN2022/103310," mailed on Dec. 21, 2022, pp. 1-4.

* cited by examiner

*Primary Examiner* — William J Carter
(74) *Attorney, Agent, or Firm* — CKC & Partners Co., LLC

(57) ABSTRACT

A lighting device includes a lamp panel, an adapter plate, and a control unit. The lamp panel has a first connecting end, the control unit has a second connecting end, and the adapter plate has a third connecting end and a fourth connecting end. The third connecting end is opposite to the first connecting end and is electrically connected to the first connecting end, and the fourth connecting end is opposite to the second connecting end and is electrically connected to the second connecting end.

17 Claims, 8 Drawing Sheets

LIGHTING DEVICE AND CEILING FAN LAMP

CROSS-REFERENCE TO RELATED APPLICATION

This application is a continuation of international application of PCT application serial no. PCT/CN2022/103310 filed on Jul. 1, 2022, which claims the priority benefit of China application no. 202220864717.0 filed on Apr. 14, 2022. The entirety of each of the above mentioned patent applications is hereby incorporated by reference herein and made a part of this specification.

BACKGROUND

Technical Field

The present application relates to the technical field of lighting and more particularly to a lighting device and a ceiling fan lamp.

Description of Related Art

Each pin of a control unit of a conventional ceiling fan lamp is directly connected to a welding point of a lamp panel, and the control unit is usually a standardized part. However, the arrangements of pins of different types of control units are different. In practical products, according to the usage requirements of different types of control units, under the condition that the lamp panel design is unchanged, pins of different types of control units are difficult to correspond to welding points on the lamp panel. If the lamp panel is remanufactured, the production flow will be complicated and the production cost will increase.

SUMMARY

Based on this, it is necessary to provide a lighting device and a ceiling fan lamp, so as to solve the technical problem that under the condition that the lamp panel design is unchanged, pins of different types of control units are difficult to correspond to welding points on the lamp panel. And further to solve the technical problems that the production flow will be complicated and the production cost will increase because the lamp panel is remanufactured.

In the first aspect, the present application provides a lighting device. The lighting device includes a lamp panel, an adapter plate, and a control unit. Both the adapter plate and the control unit are electrically connected to the lamp panel. The lamp panel has a first connecting end, the control unit has a second connecting end, the adapter plate has a third connecting end and a fourth connecting end, the third connecting end is arranged opposite to the first connecting end and is electrically connected to the first connecting end, and the fourth connecting end is arranged opposite to the second connecting end and is electrically connected to the second connecting end.

In one of the embodiments, the adapter plate is arranged on the lamp panel, and the control unit is arranged on the adapter plate.

In one of the embodiments, the control unit is provided with an antenna, the lamp panel is provided with an avoidance hole, and the avoidance hole is arranged opposite to the antenna.

In one of the embodiments, the lighting device further comprises an LED lamp and an LED driving chip, and the LED lamp and the LED driving chip are both arranged on the lamp panel.

In one of the embodiments, the lighting device further comprises a host and a connecting assembly, and the host is connected to the lamp panel through the connecting assembly.

In one of the embodiments, the connecting assembly comprises a bottom plate and a fastener, the host and the lamp panel are respectively provided at two sides of the bottom plate, and the host, the bottom plate, and the lamp panel are connected by the fastener.

In one of the embodiments, the lighting device further comprises a protective cover, the bottom plate and the protective cover form an accommodating space by covering, and the lamp panel is arranged in the accommodating space.

In one of the embodiments, the host comprises an AC/DC circuit and a motor control circuit, and the host is provided with an accommodating cavity for accommodating the AC/DC circuit and the motor control circuit.

In the second aspect, the present application also provides a ceiling fan lamp including a fan and the lighting device according to any one of the above embodiments.

In one of the embodiments, the ceiling fan lamp further comprises a housing and a lampshade, the lampshade and the bottom plate of the lighting device enclose to form an enclosed space, or the lampshade, the bottom plate of the lighting device, and the housing enclose to form an enclosed space.

Implementing the embodiments of the present application will have the following advantageous effects.

With the lighting device of the present application, the technical problem that pins of different types of control units are difficult to correspond to welding points on the lamp panel under the condition that the lamp panel design is unchanged is effectively solved. And the technical problems that production flow will be complicated and the production cost will increase is effectively avoided because the lamp panel is remanufactured. Specifically, since the adapter plate which third connecting end is electrically connected to the first connecting end of the lamp panel, and fourth connecting end is electrically connected to the second connecting end of the control unit is provided, therefore, when a new control unit is needed, only an adapter plate adapted to the new control unit needs to be replaced such that the new control unit can be installed on the lamp panel, so as to avoid re-manufacturing the lamp panel corresponding to the second connecting end of the new control unit. Thereby, the problems of complicated production flow and increased production cost are effectively solved.

BRIEF DESCRIPTION OF THE DRAWINGS

In order to explain the embodiments of the present application or the technical solutions in the prior art more clearly, the accompanying drawings that need to be used in the description of the embodiment or the prior art will be briefly introduced below; obviously, the drawings in the description below are merely some of the embodiment of the present application, and for those of ordinary skills in the art, other drawings can also be obtained from these drawings without creative effort.

DESCRIPTION OF THE EMBODIMENTS

Figure 1:
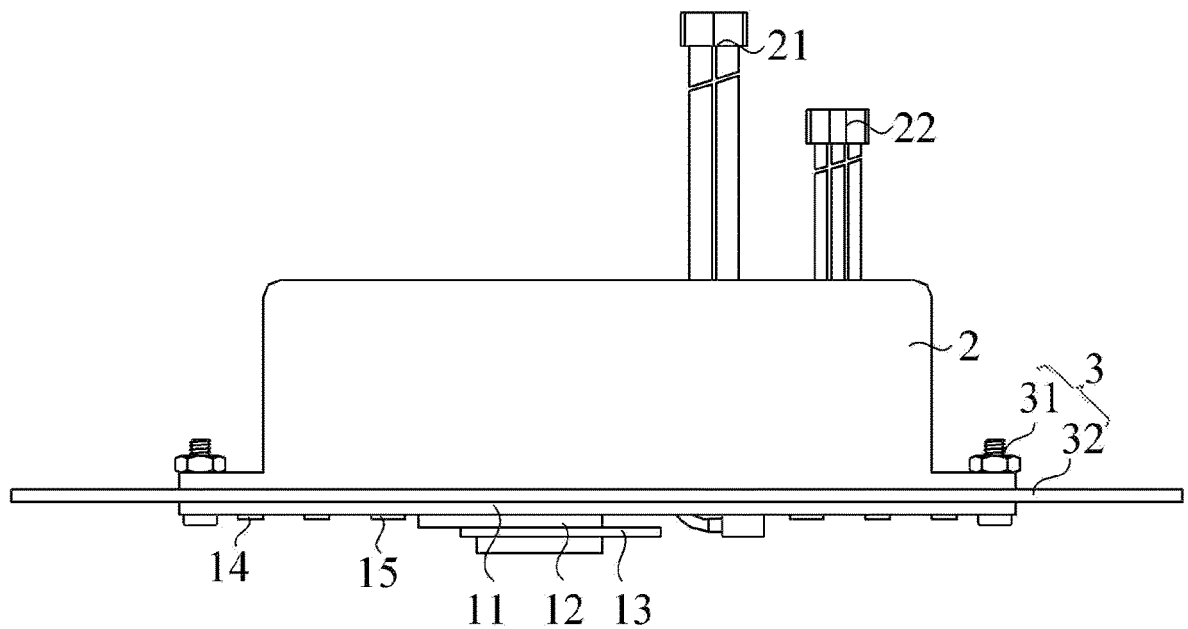
FIG. 1 is a front view of a lighting device in one embodiment.

The technical solutions in the embodiments of the present application will be clearly and completely described below with reference to the accompanying drawings in the embodiments of the present application. Obviously, the described embodiments are only a part of the embodiments of the present application, but not all of the embodiments. Based on the embodiments in the present application, all the other embodiments obtained by a person of ordinary skills in the art without involving any inventive effort fall within the scope of protection of the present application.

The lighting device of the present application will now be described with reference to FIG. 1 to FIG. 11. The lighting device comprises a lamp panel 11, an adapter plate 12, and a control unit 13. The adapter plate 12 and the control unit 13 are both electrically connected to the lamp panel 11. The lamp panel 11 has a first connecting end, the control unit 13 has a second connecting end, and the adapter plate 12 has a third connecting end and a fourth connecting end. The third connecting end is arranged opposite the first connecting end to facilitate the electrical connection between the third connecting end and the first connecting end. The fourth connecting end is arranged opposite the second connecting end to facilitate the electrical connection between the fourth connecting end and the second connecting end.

In the embodiment, each of the first connecting end, the second connecting end, the third connecting end, and the fourth connecting end has multiple pins. The third connecting end is soldered to the first connecting end. The fourth connecting end is soldered to the second connecting end.

In summary, the technical solutions for carrying out the present embodiment have the following advantageous effects. Since the adapter plate 12 is provided, the third connecting end of the adapter plate 12 is electrically connected to the first connecting end of the lamp panel 11, and the fourth connecting end is electrically connected to the second connecting end of the control unit 13. Therefore, when a new control unit 13 needs to be replaced, only the adapter plate 12 adapted to the new control unit 13 needs to be replaced such that the new control unit 13 can be installed on the lamp panel 11, thereby avoiding re-manufacturing the lamp panel 11 corresponding to the second connecting end of the new control unit 13, and effectively solving the problems of complicated production flow and increased production costs.

In the present embodiment, as shown in FIG. 1 to FIG. 4, the adapter plate 12 is provided on the lamp panel 11, and the control unit 13 is provided on the adapter plate 12. Further, the adapter plate 12 provides a certain distance between the control unit 13 and the lamp panel 11 such that the control unit 13 has an increased contact area with the outside, and better enables the control unit 13 to dissipate heat. In addition, the adapter plate 12 can also isolate the heat generated by the lamp panel 11, thereby preventing adverse effects on the control unit 13.

Figure 3:
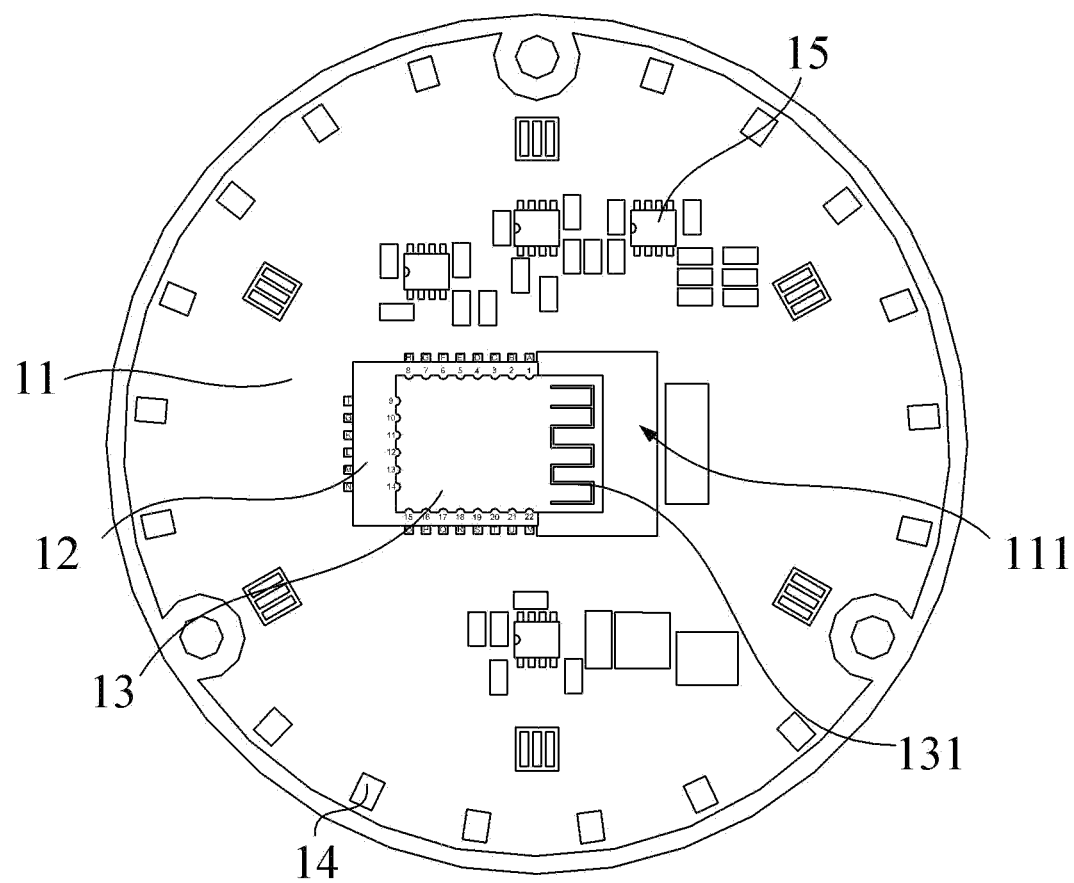
FIG. 3 is a schematic view of a lamp panel in the lighting device shown in FIG. 1.
Figure 4:
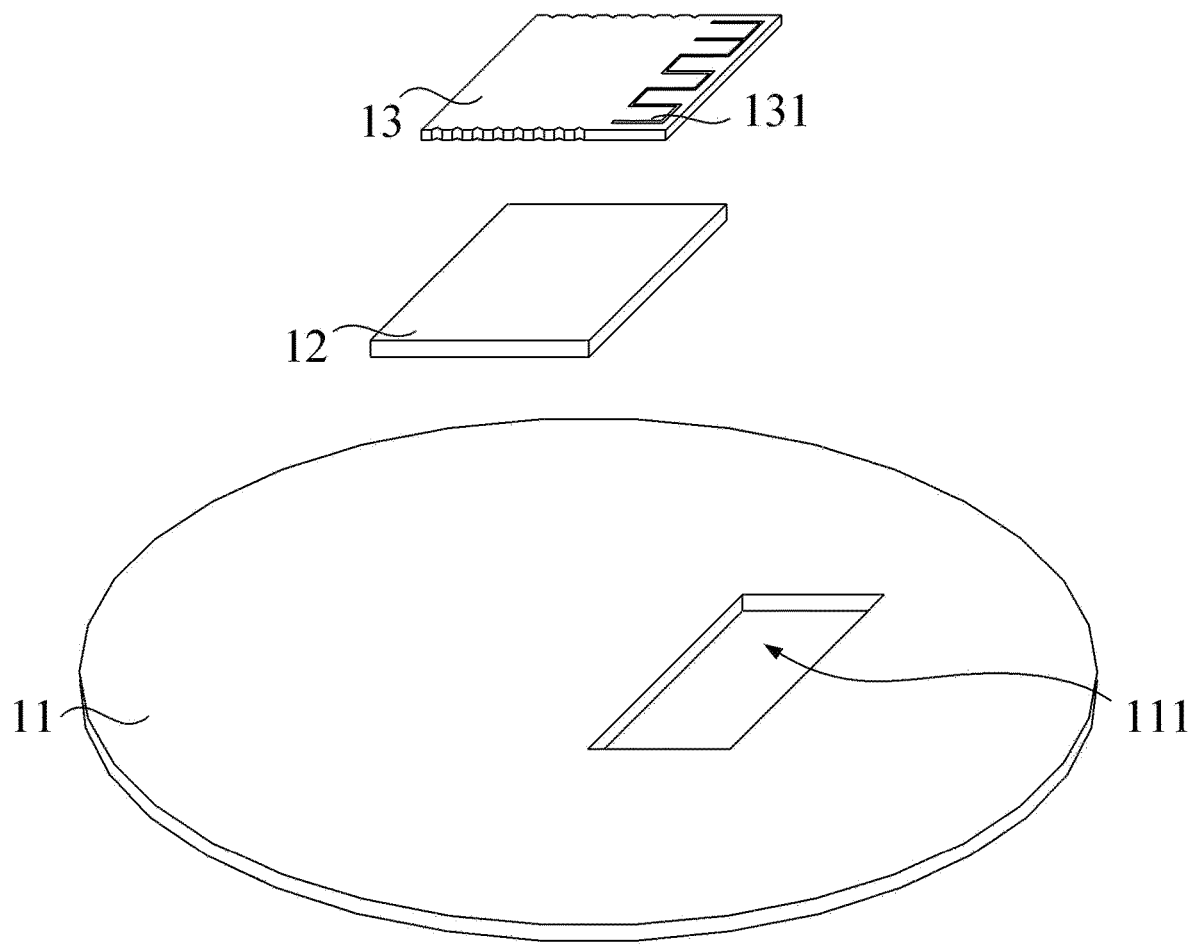
FIG. 4 is an exploded view of a lamp panel in the lighting device shown in FIG. 1.

In the present embodiment, as shown in FIG. 3 and FIG. 4, the control unit 13 is provided with an antenna 131, and the lamp panel 11 is provided with an avoidance hole 111, the avoidance hole 111 being provided opposite to the antenna 131. Further, the control unit 13 is provided on the adapter plate 12 so that the antenna 131 is exposed, and the adapter plate 12 makes a certain spacing between the lamp panel 11 and the control unit 13 so that the signal of the antenna 131 is not interfered. In addition, the arrangement of the avoidance hole 111 opposite to the antenna 131 enables the antenna 131 to be located away from a metal part. Since the control unit 13 is not shielded by metal, the signal of the control unit 13 can be made good without an external antenna.

In an embodiment, as shown in FIG. 1 and FIG. 3, the lighting device further comprises an LED lamp 14 and an LED driving chip 15, both the LED lamp 14 and the LED driving chip being arranged on the lamp panel 11. Further, the LED lamp 14 and the LED driving chip 15 are used for lighting.

Figure 2:
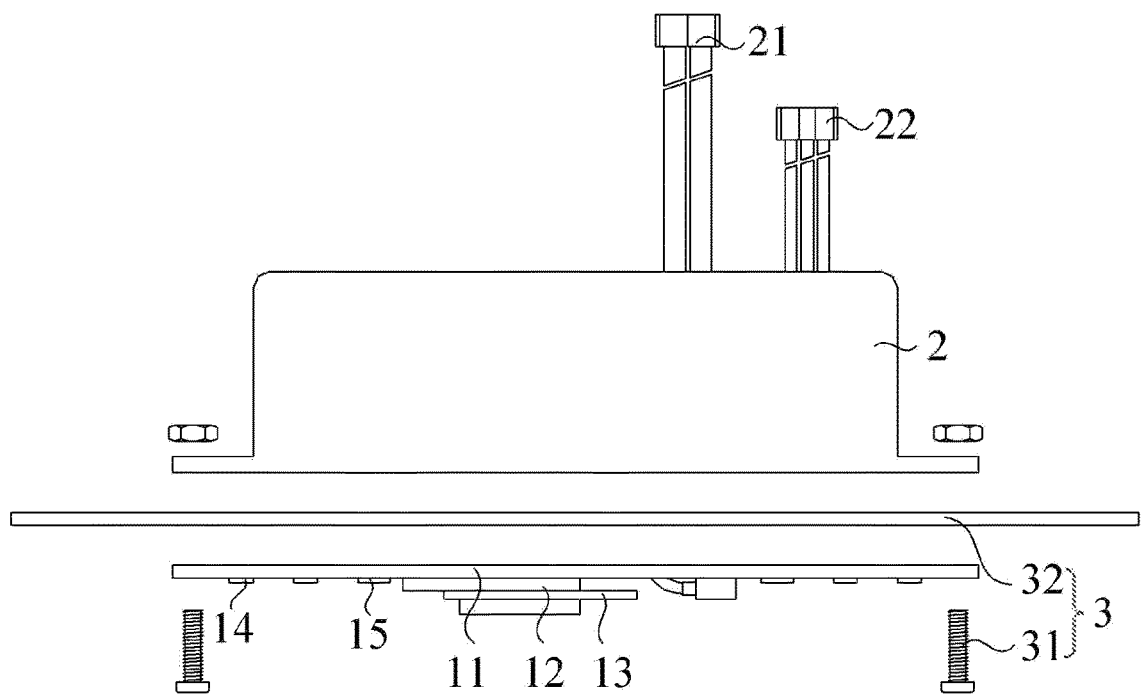
FIG. 2 is an exploded view of the lighting device shown in FIG. 1.

In an embodiment, as shown in FIG. 1 and FIG. 2, the lighting device further comprises a host 2 and a connecting assembly 3, the host 2 being connected to the lamp panel 11 via the connecting assembly 3. Further, the host 2 is connected to the lamp panel 11 through the connecting assembly 3, so that the lighting device is of a unitary structure, and so that the lighting device can be used alone, thereby facilitating production assembly in a factory. In case of damage to the lighting device, the lighting device can be replaced alone, facilitating maintenance.

In the present embodiment, the connecting assembly 3 includes a bottom plate 32 and a fastener 31. The host 2 and lamp panel 11 are respectively provided on two sides of the bottom plate 32, and the host 2, the bottom plate 32, and the lamp panel 11 are connected by the fastener 31. Further, the bottom plate 32 is made of a metal plate so as to transfer the heat from the lamp panel 11, and the fastener 31 is provided for easy installation and removal.

Specifically, the fastener 31 can be in a fixing mode of cooperating a screw and a nut, the fastener 31 can also be in a fixing mode of a rivet, or the fastener 31 can be in a fixing mode of snap-on.

Figure 5:
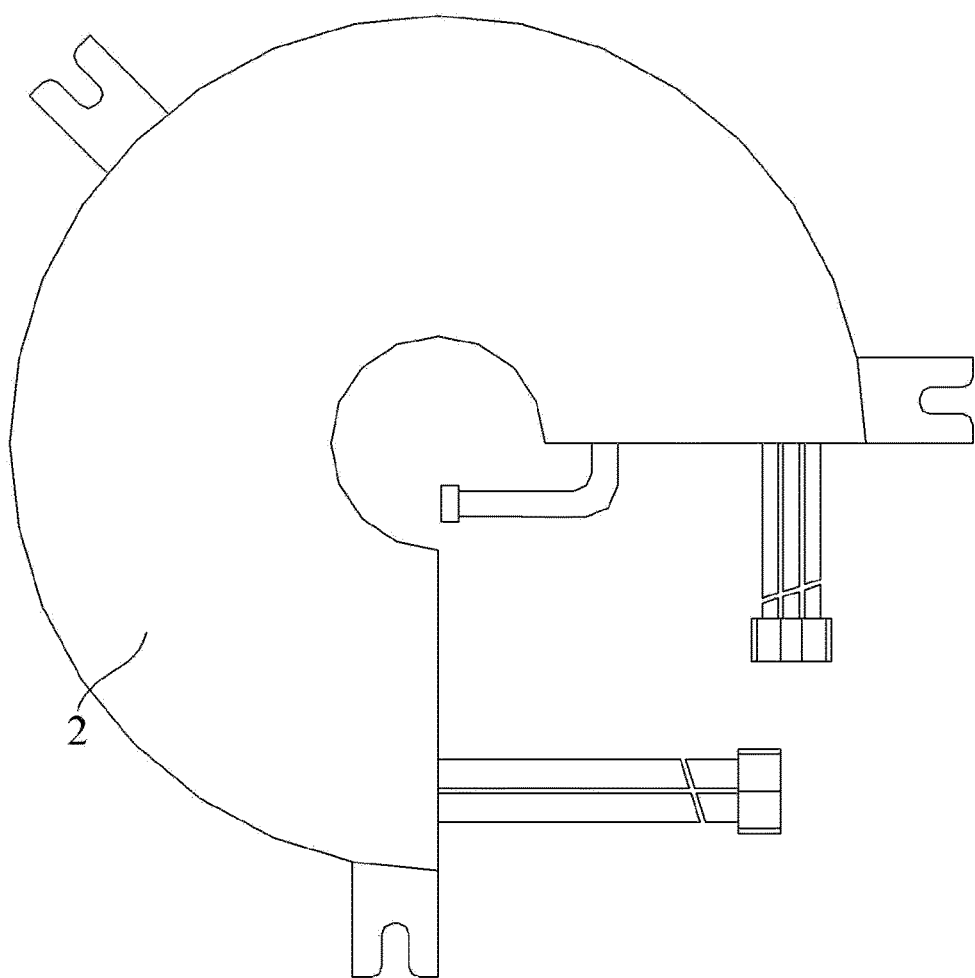
FIG. 5 is a schematic view of a host in the lighting device shown in FIG. 1.

In an embodiment, as shown in FIG. 5, the host 2 is a plastic shell, and the outer sizes of the host 2 may be variously modified to facilitate the installation of the lighting device.

Figure 7:
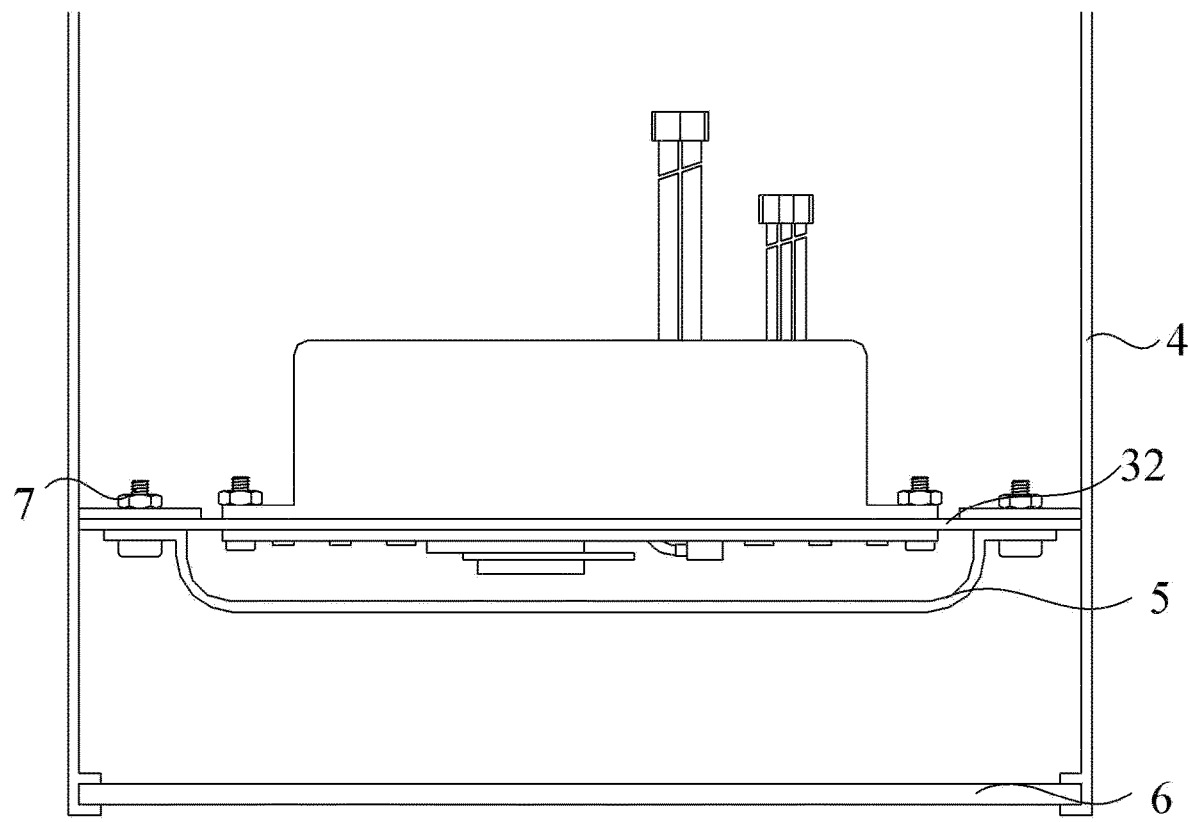
FIG. 7 is schematic view 1 of a ceiling fan lamp in one embodiment.
Figure 8:
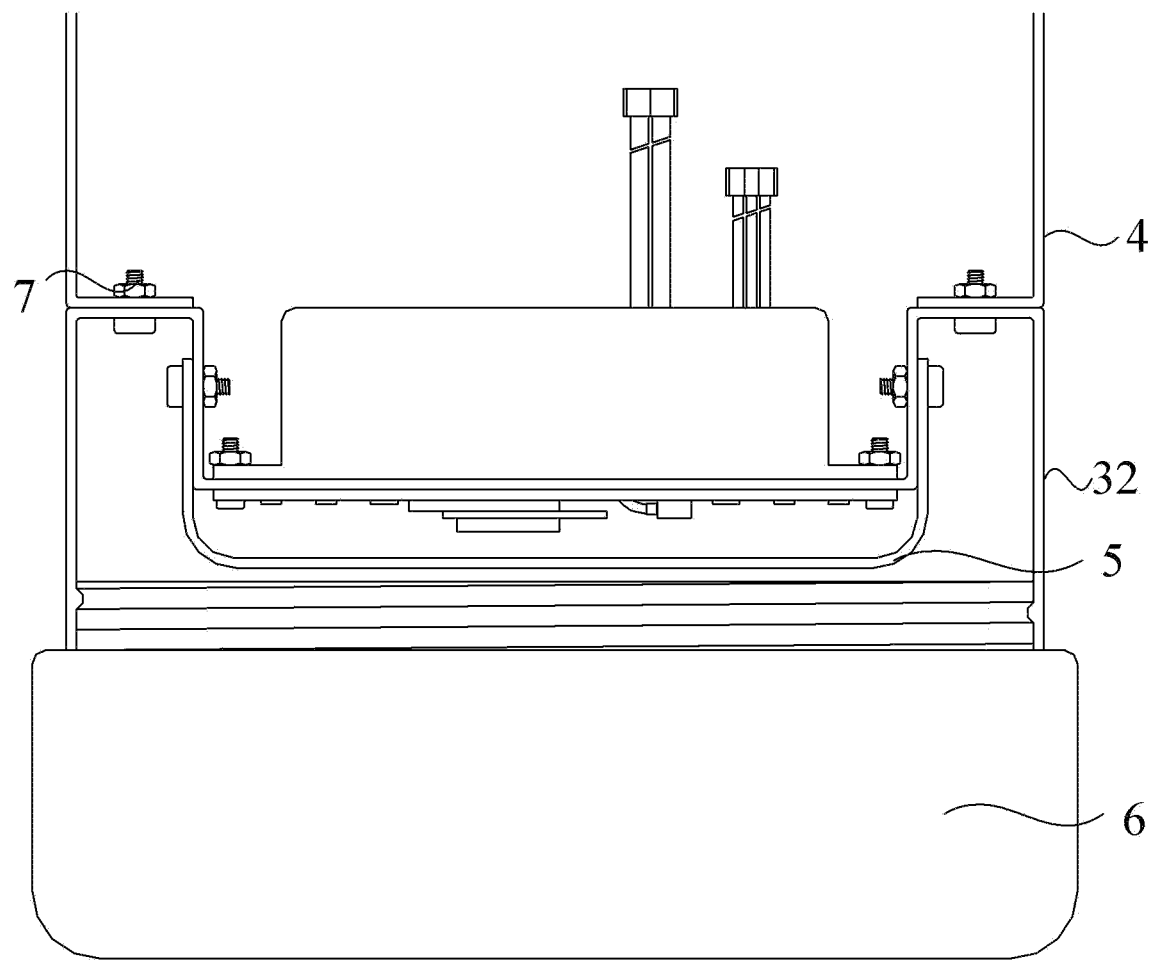
FIG. 8 is schematic view 2 of a ceiling fan lamp in one embodiment.
Figure 9:
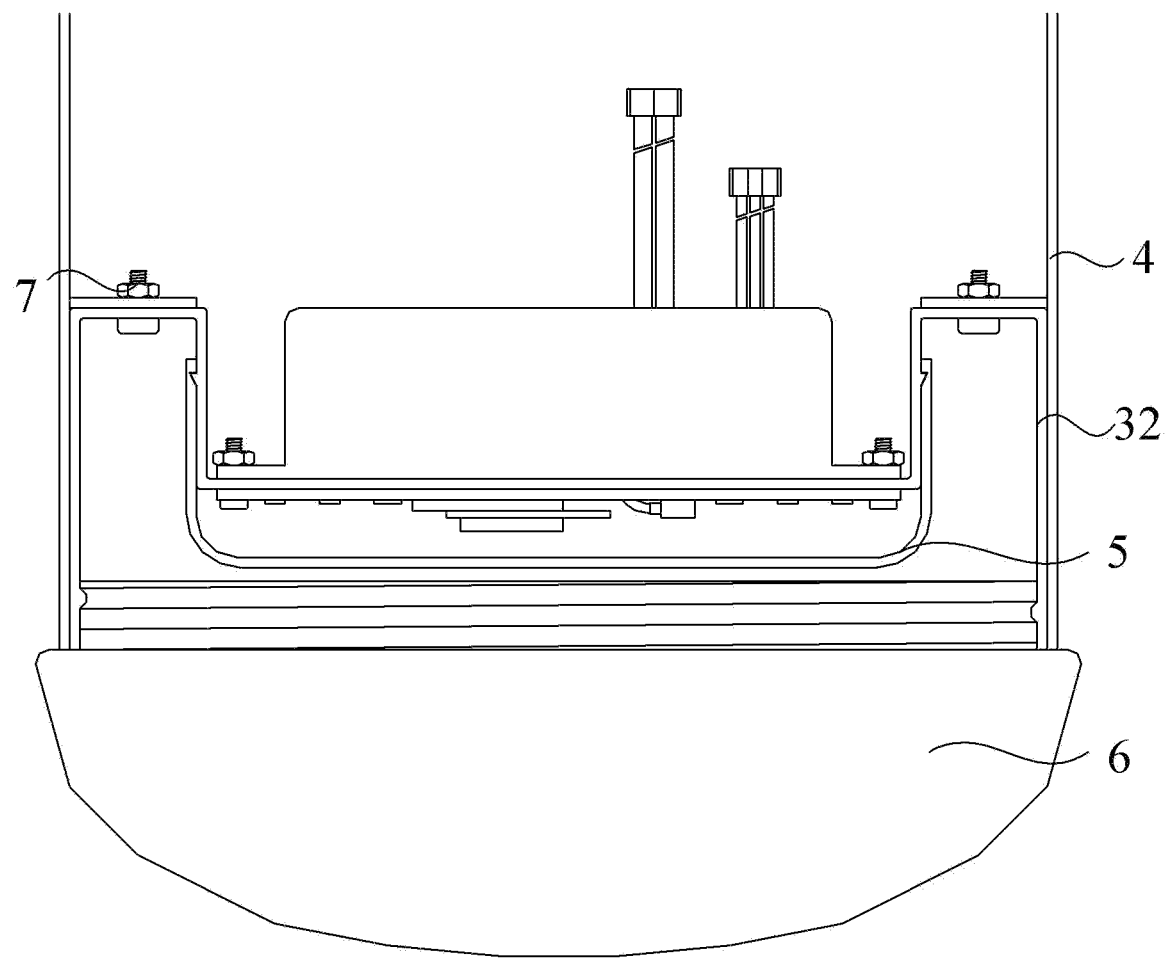
FIG. 9 is schematic view 3 of a ceiling fan lamp in one embodiment.

In an embodiment, as shown in FIG. 7 to FIG. 9, the lighting device further comprises a protective cover 5, the bottom plate 32 and the protective cover 5 form an accommodating space by covering, and the lamp panel 11 is arranged in the accommodating space. Further, the protective cover 5 is a transparent protective cover capable of preventing the lamp panel 11 from being damaged due to the influence of the external environment, thereby further improving the service life. In addition, the protective cover 5 also protects the user from the risk of electric shock during the installation or maintenance.

Specifically, the manner of covering the bottom plate 32 with the protective cover 5 may be a screw-and-nut cooperating fixing manner, or a snap-on fixing manner.

Figure 6:
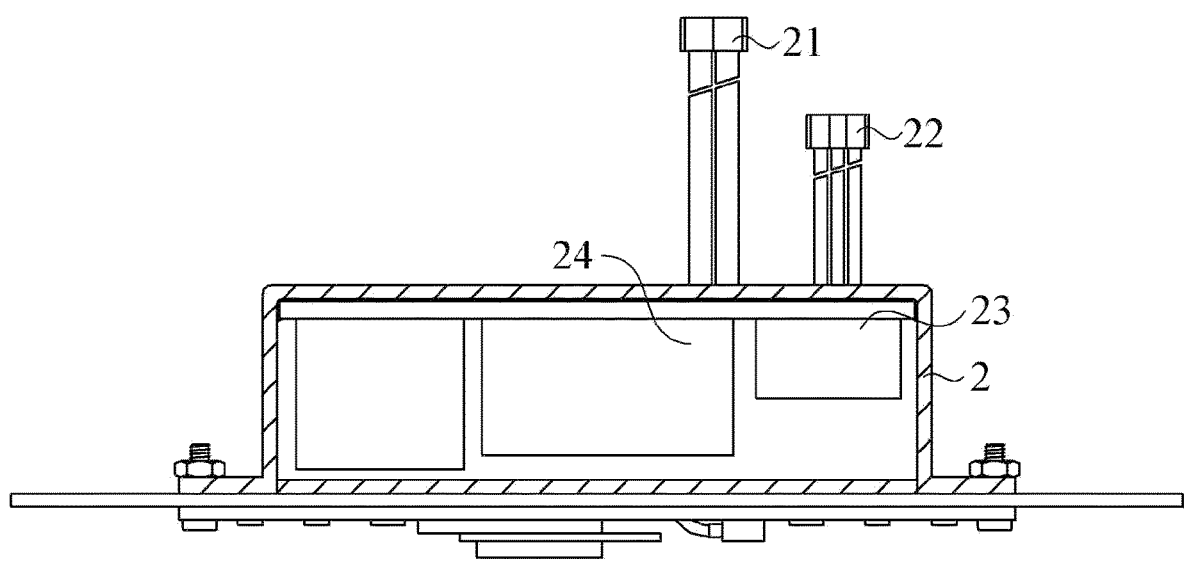
FIG. 6 is a cross-sectional view of a lighting device in the lighting device shown in FIG. 1.

In an embodiment, as shown in FIG. 6, the host 2 includes an AC/DC circuit 23 and a motor control circuit 24, and the host 2 is provided with an accommodating cavity for accommodating the AC/DC circuit 23 and the motor control circuit 24. Further, providing the AC/DC circuit 23 and the motor control circuit 24 in the host 2 solves the problem that the AC/DC circuit 23 and the motor control circuit 24 are provided on the lamp panel 11 that causes the lamp panel 11 to become larger in size and unable to adapt to the compact ceiling fan lamp.

In the embodiment, the host 2 further includes a power wire 21 for connecting to a power source and a motor connecting line 22 for connecting to a motor.

In an embodiment, as shown in FIG. 7 to FIG. 9, the ceiling fan lamp further comprises a housing 4 and a lampshade 6. The lampshade 6 and the bottom plate 32 of the lighting device enclose to form an enclosed space, or the lampshade 6, the bottom plate 32 of the lighting device, and the housing 4 enclose to form an enclosed space, the lighting device is arranged in the enclosed space, and the lampshade 6 is arranged so as to effectively prevent the lighting device from being affected by the external environment which results in the lighting device being damaged. The bottom plate 32 can vary with different outer shapes of the housing 4 so that the bottom plate 32 can be connected to the housing 4. Further, the way in which the lampshade 6 encloses with the bottom plate 32 of the lighting device or the way in which the lampshade 6, the bottom plate 32 of the lighting device, and the housing 4 enclose can be a connecting member 7 connection. The connecting member 7 can be a screw-and-nut cooperating fixing way, also a fixing way of a rivet, or a fixing way of snap-on, so that the lighting assembly and the ceiling fan lamp can be conveniently installed and removed. At that, the lighting assembly is easily replaced when damaged.

Alternatively, the bottom plate 32 serves as a support part, and may be variously modified according to the structure of the ceiling fan lamp. The bottom plate 32 may have a circular shape, a square shape, or a random shape, and may be randomly adjusted in size so that the bottom plate 32 is closely integrated with the ceiling fan lamp.

Figure 10:
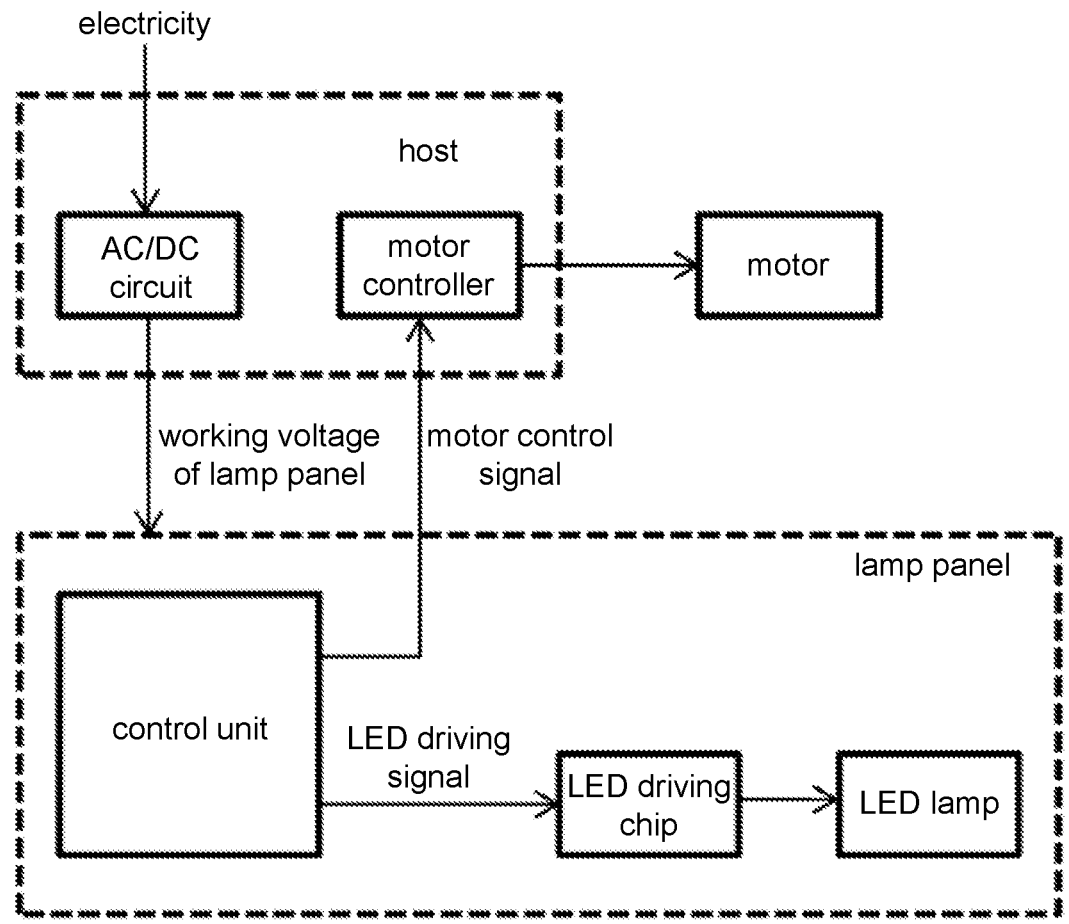
FIG. 10 is a block diagram of a lighting device in one embodiment.

In an embodiment, as shown in FIG. 10, an AC/DC circuit 23 is provided in the host 2, and the AC/DC circuit 23 is responsible for providing working voltage to each unit circuit. After receiving a control signal, the control unit 13 outputs an LED driving signal and a motor control signal. After the LED driving signal passes through the LED driving chip 15, the LED driving chip 15 controls the operation of the LED lamp 14 to realize the functions of switching, brightness adjustment, color temperature adjustment, color adjustment, etc. of the LED lamp 14. The motor control signal is transmitted to the motor controller, and the motor controller controls the motor to rotate so that the fan switches, adjusts the speed, changes the direction and realizes other functions. The host 2 and the lamp panel 11 are connected via a cable, multiple electric wires are provided in the cable to provide the working voltage required by the lamp panel 11, and one or more data lines transmit the motor control signal output by the control unit 13 back to the host 2.

Alternatively, the control unit 13 may be of various types, and the control unit 13 may be one or a combination of more than one of radio receiving circuits, Wi-Fi, Bluetooth, Zigbee, voice receiving circuits, infrared receiving circuits, and the like.

Figure 11:
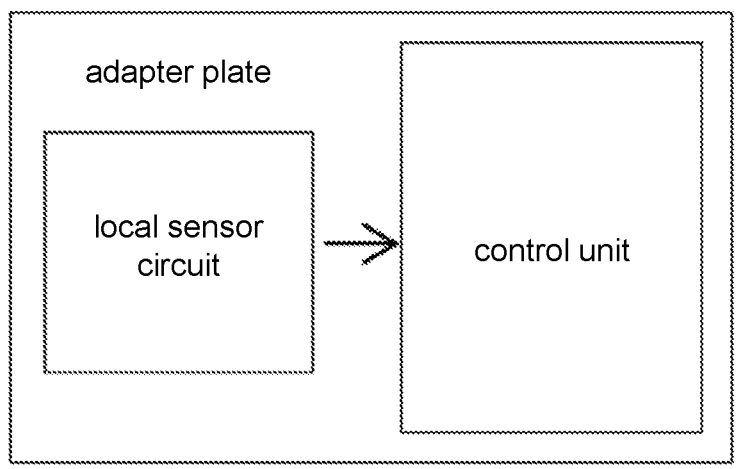
FIG. 11 is a block diagram of adding a local sensor to an adapter plate in one embodiment.

In an embodiment, as shown in FIG. 11, the control unit 13 and a local sensor are installed on the adapter plate 12. The control unit 13 may also receive a signal from the local sensor. The local sensor may be one or a combination of more than one of a motion sensor, an occupancy sensor, a light sensor, a temperature sensor, etc.

Specifically, the local sensor is used for monitoring a local space. After sensing the preset information, a signal is output to the control unit 13, so that the ceiling fan lamp automatically enters a set working state, so as to achieve the purpose of saving energy and electricity.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A lighting device, comprising: a lamp panel, an adapter plate, a control unit, an LED lamp, and an LED driving chip, wherein the adapter plate and the control unit are both electrically connected to the lamp panel, and the LED lamp and the LED driving chip are both arranged on the lamp panel;

the lamp panel has a first connecting end, the control unit has a second connecting end, the adapter plate has a third connecting end and a fourth connecting end, the third connecting end is arranged opposite to the first connecting end and is electrically connected to the first connecting end, and the fourth connecting end is arranged opposite to the second connecting end and is electrically connected to the second connecting end, the adapter plate is located between the lamp panel and the control unit, wherein each of the first connecting end, the second connecting end, the third connecting end, and the fourth connecting end has multiple pins, wherein the third connecting end is soldered to the first connecting end, wherein the fourth connecting end is soldered to the second connecting end, wherein the control unit is configured to output an LED driving signal, and wherein the LED driving chip is configured to control the LED lamp after receiving the LED driving signal.

2. The lighting device according to claim 1, wherein the adapter plate is arranged on the lamp panel, and the control unit is arranged on the adapter plate.

3. The lighting device according to claim 2, wherein the control unit is provided with an antenna, the lamp panel is provided with an avoidance hole, and the avoidance hole is arranged opposite to the antenna.

4. A ceiling fan lamp, wherein the ceiling fan lamp comprises a fan and the lighting device according to the claim 3.

5. The ceiling fan lamp according to claim 4, wherein the ceiling fan lamp further comprises a housing and a lampshade, the lampshade and a bottom plate of the lighting device enclose to form an enclosed space, or the lampshade, the bottom plate of the lighting device, and the housing enclose to form an enclosed space.

6. A ceiling fan lamp, wherein the ceiling fan lamp comprises a fan and the lighting device according to the claim 2.

7. The ceiling fan lamp according to claim 6, wherein the ceiling fan lamp further comprises a housing and a lampshade, the lampshade and a bottom plate of the lighting device enclose to form an enclosed space, or the lampshade, the bottom plate of the lighting device, and the housing enclose to form an enclosed space.

8. The lighting device according to claim 1, wherein the lighting device further comprises a host and a connecting assembly, and the host is connected to the lamp panel through the connecting assembly.

9. The lighting device according to claim 8, wherein the connecting assembly comprises a bottom plate and a fastener, the host and the lamp panel are respectively provided at two sides of the bottom plate, and the host, the bottom plate, and the lamp panel are connected by the fastener.

10. The lighting device according to claim 9, wherein the lighting device further comprises a protective cover, the bottom plate and the protective cover form an accommodating space by covering, and the lamp panel is arranged in the accommodating space.

11. A ceiling fan lamp, wherein the ceiling fan lamp comprises a fan and the lighting device according to the claim 7.

12. A ceiling fan lamp, wherein the ceiling fan lamp comprises a fan and the lighting device according to the claim 6.

13. The lighting device according to claim 8, wherein the host comprises an AC/DC circuit and a motor control circuit, and the host is provided with an accommodating cavity for accommodating the AC/DC circuit and the motor control circuit.

14. A ceiling fan lamp, wherein the ceiling fan lamp comprises a fan and the lighting device according to the claim 8.

15. A ceiling fan lamp, wherein the ceiling fan lamp comprises a fan and the lighting device according to the claim 5.

16. A ceiling fan lamp, wherein the ceiling fan lamp comprises a fan and the lighting device according to claim 1.

17. The ceiling fan lamp according to claim 16, wherein the ceiling fan lamp further comprises a housing and a lampshade, the lampshade and a bottom plate of the lighting device enclose to form an enclosed space, or the lampshade, the bottom plate of the lighting device, and the housing enclose to form an enclosed space.

* * * * *